July 24, 1962  J. E. BECKER  3,045,790
MECHANICAL CLUTCHES

Filed Sept. 20, 1960  2 Sheets-Sheet 1

INVENTOR
JOHN E. BECKER

BY: *Charles E. Church*
ATTORNEY

July 24, 1962　　　J. E. BECKER　　　3,045,790
MECHANICAL CLUTCHES

Filed Sept. 20, 1960　　　2 Sheets-Sheet 2

INVENTOR
JOHN E. BECKER

BY: Charles E. Church
ATTORNEY

United States Patent Office 3,045,790
Patented July 24, 1962

3,045,790
MECHANICAL CLUTCHES
John E. Becker, R.R. 3, Darlington, Ontario, Canada
Filed Sept. 20, 1960, Ser. No. 57,352
5 Claims. (Cl. 192—38)

This invention relates to a mechanical clutch for the transmission of power from one rotating member to another and is particularly directed to the type of arrangement wherein a rotatable member, such as a shaft, extends through the bore of a rotatable member; the object of the invention being to provide a clutch arrangement whereby power may be transmitted from the shaft to the rotatable member or vice-versa as occasion requires; the arrangement also permitting the clutch to be operated while under load and also restraining the driving member against over-running the driven member whereby the driven member may exert a braking effect.

A particular object of the invention is to provide a clutch wherein the clutch arrangement consists of a plurality of slideable wedges interposed between the two rotatable members, movement of the wedges in one direction causing them to jam between the members to provide the clutch connection and movement in the opposite direction releasing the clutch; the wedges being positioned within the bore of the rotatable member for sliding movement lengthwise of the bore and shaft and having their inner faces parallel to the shaft and their outer faces inclined in relation to the axis of the shaft and slideably bearing against inclined faces within the rotatable member.

Another object of the invention is to provide a plurality of loosely mounted rollers positioned between the faces of the wedges and the shaft and arranged to roll upon the shaft when the clutch is disengaged and to be engaged by the wedges and jammed between the wedges and the shaft when the wedges are moved to engage the clutch.

A further object of the invention is to provide a cage contained within the bore and surrounding the shaft and having a plurality of orifices within which the rollers are freely contained.

A still further object of the invention provides a pair of spaced apart flanges upon the shaft and between which the wedges are slideably mounted, the flanges containing a plurality of orifices within which wedge push pins are slideably contained, the pins in the respective flanges being moved in unison by any suitable means such as a pair of thrust rings moveable lengthwise of the shaft under fluid pressure.

With the foregoing and other objects in view, as shall appear, the invention consists of a mechanical clutch constructed and arranged all as hereinafter more particularly described and illustrated in the accompanying drawings in which.

Figure 1:
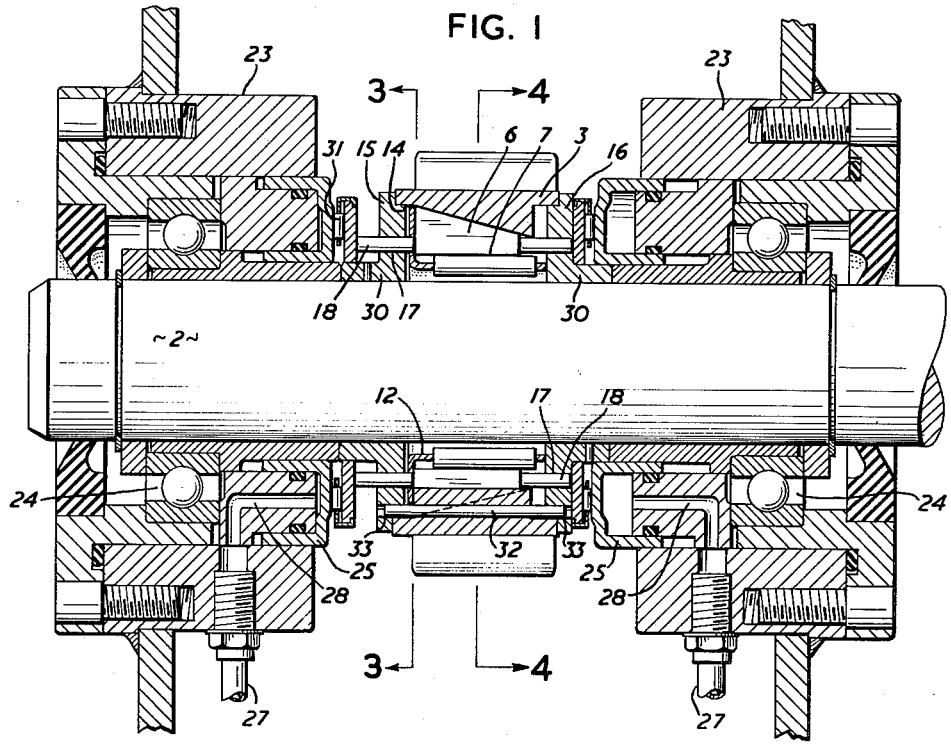
FIG. 1 is a longitudinal view through the clutch and fluid pressure elements for actuating the clutch, the clutch being in the disengaged position.

The clutch provides a driving connection between a rotatable shaft 2 and a rotatable member having a bore through which the shaft extends, such as the ring gear 3 having external teeth 4.

The bore of the ring gear is formed with a plurality of similar equally spaced apart slots 5 within which a plurality of wedges 6 are slidably contained, the exposed faces 7 of the wedges being in parallel relation to the axis of the shaft 2 and the inner faces 8 of the wedges inclined and bearing against the inner faces 9 of the slots which are of the same inclination.

Figure 5:
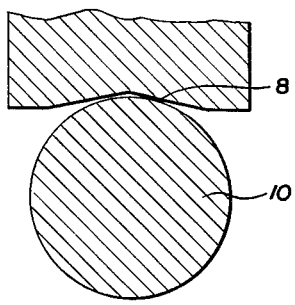
FIG. 5 is an enlarged cross-sectional detail through a portion of a wedge and a roller.

A plurality of similar rollers 10 are interposed between the wedge faces 7 and the shaft 2, the assembly being so dimensioned that when the wedges are slid within the slots 5, in a right hand direction as shown in FIG. 1, the rollers 10 are jammed between the wedges and the shaft and thus provide a firm clutching engagement of the ring gear to the shaft. To ensure against any possibility of the wedges rolling across the faces of the rollers when the clutch is in engagement, the faces 8 of the rollers are of concave V-shape with their apices in parallel relation to the axis of the shaft, as shown in FIG. 5.

For the purpose of retaining the rollers 10 in alignment with the wedges 6 a cage is provided to rotate in unison with the ring gear 3, the cage comprising a sleeve portion 12 positioned within the ring gear and surrounding the shaft and a flange portion 13 formed upon the end of the sleeve portion and through which the shaft extends, the flange being freely contained within one of a pair of recesses 14 in the faces of the ring gear 3. The ring gear is positioned between a pair of similar flanges 15 and 16 freely mounted upon the shaft to rotate with the ring gear and protruding into the ring gear recesses 14.

Each of the flanges 15 and 16 contain a set of circularly arranged orifices 17, each orifice being in alignment with an end of a wedge 6 and through which a plurality of push pins 18 slideably extend to rest against the ends of the wedges. It will thus be seen that when the set of push pins in the orifices in the flange 15 are urged towards the ring gear that the resultant sliding movement of the wedges 6 along the inclined faces 9 of the wedge containing slots 5 will cause the wedges to approach the rollers 10 and thus jam the rollers between the wedges and the shaft with resultant engagement of the clutch. Similar urging of the push pins in the orifices in the flange 16 moves the wedges in the opposite direction to relieve the jamming action of the rollers with resultant disengagement of the clutch.

The flange portion 13 of the roller containing cage is positioned within the ring gear recess 14 behind the flange 15 and contains a plurality of orifices 19 in similar circular arrangement to the push pin containing orifices in the flange 15 and through which the push pins freely extend. As the rollers 10 are subjected to a momentary side thrust in the instant of initial jamming action which may tend to slightly swing the cage about its axis, the flange orifices 19 are formed of somewhat greater width than the diameter of the pins to allow the flange of the cage sufficient play to allow for any such slight motion.

Figure 3:
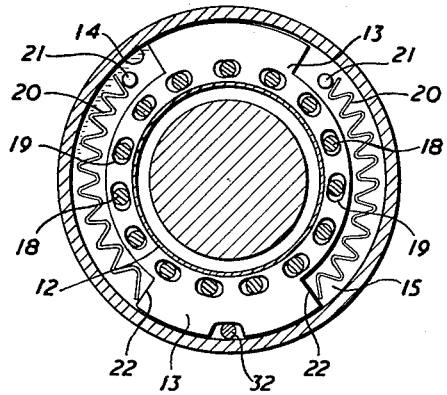
FIG. 3 is a transverse cross-sectional view taken through the line 3—3, FIG. 1.
Figure 4:
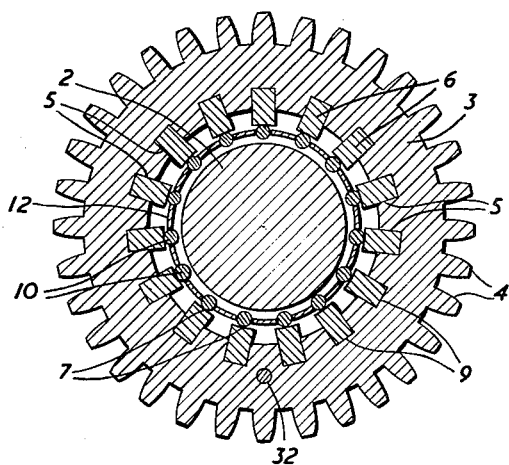
FIG. 4 is a transverse cross-sectional view taken through the line 4—4, FIG. 1.

To restore the cage to a neutral position from which it may swing in either direction a pair of opposed flat corrugated springs 20 are furnished to be contained within recesses in the edge portion of the flange 13 as shown in FIG. 3. The springs extend between a pair of pins 21 protruding from the inner face of the flange 15 and the shoulders 22 at the ends of the recesses in the cage flange, the springs providing equal opposed pressures which always return the cage to the neutral position, shown in FIG. 3, when the clutch is disengaged.

To actuate the sets of push pins 18 any suitable mechanism may be used, such as the pair of similar arrangements shown in FIG. 1, each broadly consisting of a housing 23 containing a ball race 24 within which the shaft 2 is rotatably mounted. The inner opposite portions of the housings carry ring pistons 25 of U-shaped cross section slideably contained within pairs of concentric slots 26 and actuated by the pressure of fluid entering the housings through the pipes 27 and passing to the pistons through the ducts 28, the passage of fluid being controlled by a suitable valve arrangement, not shown. A pair of thrust rings 29 are slideably positioned upon sleeve portions 30 of the flanges 15 and 16 to engage the outer ends of the push pins 18, the thrust rings carrying thrust bearings 31 which freely rotate against the outer faces of the pistons. To retain the assembly of ring gear 3 and flanges 15 and 16 in rotative movement as a unit the gear carries a pin 32 which slidably projects into orifices 33 in the flanges.

Figure 2:
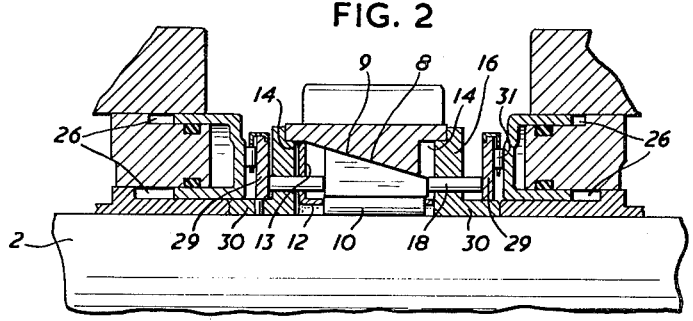
FIG. 2 is a fragmentary portion of the view illustrated in FIG. 1, and showing the engaged position of the clutch.

When it is desired to engage the clutch, fluid under pressure is admitted to the left hand housing and fluid pressure relieved in the right hand housing and to permit it to drain, and whereby the piston under fluid pressure advances to press its thrust ring and pins towards the ring gear with resultant movement of the wedges and jamming of the rollers 10 between the wedges and the shaft as previously described and illustrated in FIG. 2.

To release the clutch, fluid under pressure is admitted to the right hand housing and fluid pressure relieved in the left hand housing and whereby the wedges are moved in the opposite direction to remove wedge pressure upon the rollers and allow the clutch to run free, as illustrated in FIG. 1.

From the foregoing description it will be appreciated that the clutch is capable of engagement or disengagement under load and that either the rotatable member or the shaft member may be the driving element; furthermore as the members are positively locked together when the clutch is engaged the driving member is restrained against over running the driven member whereby the driven member is capable of exerting a braking effort.

What I claim as my invention is:

1. A mechanical clutch for transmission of power between a rotatable shaft and having a smooth cylindrical face and a rotatable element having a bore through which the shaft extends and comprising a plurality of wedges arranged in spaced apart relation and mounted for sliding movement within the bore and having their inclined faces extending lengthwise of the shaft, the wedges slidably bearing against the rotatable element and positioned in radial arrangement around the shaft, movement of the wedges in one direction bringing them closer to the shaft to engage the clutch and in the opposite direction away from the shaft to disengage the clutch, a plurality of cylindrical rollers having their axes parallel to the axis of the shaft and interposed between the shaft and the wedges and arranged to loosely roll upon the shaft when the clutch is disengaged and to be engaged by the wedges and jammed between the wedges and the shaft when the wedges are moved to engage the clutch, and means for moving the wedges in unison towards and away from the shafts, and wherein the means for moving the wedges in unison towards and away from the shaft is a pair of flanges freely carried upon the shaft in spaced apart relation and between which the wedges are slidably mounted, the flanges containing a plurality of orifices, each orifice being in alignment with the end of a wedge, a set of push pins slidably contained within the orifices in each flange and engaging the adjacent faces of the wedges and whereby pushing movement of one set of pins slides the wedges in one direction and pushing movement of the other set of pins slides the wedges in the opposite direction, and means for pushing either set of pins in unison.

2. A mechanical clutch for transmission of power between a rotatable shaft having a smooth cylindrical face and a rotatable element having a bore through which the shaft extends and comprising a plurality of wedges arranged in spaced apart relation and mounted for sliding movement within the bore and having their inclined faces extending lengthwise of the shaft, the wedges slidably bearing against the rotatable element and positioned in radial arrangement around the shaft, movement of the wedges in one direction bringing them closer to the shaft to engage the clutch and in the opposite direction away from the shaft to disengage the clutch, a plurality of cylindrical rollers having their axes parallel to the axis of the shaft and interposed between the shaft and the wedges and arranged to loosely roll upon the shaft when the clutch is disengaged and to be engaged by the wedges and jammed between the wedges and the shaft when the wedges are moved to engage the clutch, and means for moving the wedges in unison towards and away from the shaft, and wherein the faces of the wedges engageable with the rollers are substantially parallel to the rollers and the axis of the shaft and the faces of the wedges remote from the rollers inclined in relation to the axis of the shaft, the wedges being slidably contained in a plurality of slots in the rotatable element and which are arranged in parallel and radial relation to the shaft, the inner faces of the slots having substantially the same inclination as the inclination of the adjacent faces of the wedges, a cage comprising a sleeve portion and a flange portion formed upon the end of the sleeve portion and surrounding the shaft to rotate in unison with the rotatable element and in which the sleeve portion is formed with a plurality of orifices within which the rollers are freely contained and the flange portion formed with a plurality of orifices in alignment with the ends of the wedges in the rotatable element, and wherein the means for moving the wedges in unison towards and away from the shaft is a pair of flanges freely carried upon the shaft in spaced apart relation and between which the wedges are slidably mounted, the flanges containing a plurality of orifices, each orifice being in alignment with the end of a wedge, a set of push pins slidably contained within the orifices in each flange and engaging the adjacent faces of the wedges and whereby pushing movement of one set of pins slides the wedges in one direction and pushing movement of the other set of pins slides the wedges in the opposite direction, and means for pushing either set of pins in unison, the set of push pins slidably contained within one flange extending through the orifices in the flange portion of the cage.

3. A mechanical clutch for transmission of power between a rotatable shaft having a smooth cylindrical face and a rotatable element having a bore through which the shaft extends and comprising a plurality of wedges arranged in spaced apart relation and mounted for sliding movement within the bore and having their inclined faces extending lengthwise of the shaft, the wedges slidably bearing against the rotatable element and positioned in radial arrangement around the shaft, movement of the wedges in one direction bringing them closer to the shaft to engage the clutch and in the opposite direction away from the shaft to disengage the clutch, a plurality of cylindrical rollers having their axes parallel to the axis of the shaft and interposed between the shaft and the wedges and arranged to loosely roll upon the shaft when the clutch is disengaged and to be engaged by the wedges and jammed between the wedges and the shaft when the wedges are moved to engage the clutch, and means for moving the wedges in unison towards and away from the shaft, and wherein the faces of the wedges engageable with the rollers are substantially parallel to the rollers and the axis of the shaft and the faces of the wedges remote from the rollers inclined in relation to the axis of the shaft, the wedges being slidably contained in a plurality of slots in the rotatable element and which are arranged in parallel and radial relation to the shaft, the inner faces of the slots having substantially the same inclination as the inclination of the adjacent faces of the wedges, a cage comprising a sleeve portion and a flange portion formed upon the end of the sleeve portion and surrounding the shaft to rotate in unison with the rotatable element and in which the sleeve portion is formed with a plurality of orifices within which the rollers are freely contained in the flange portion formed with a plurality of orifices in alignment with the ends of the wedges in the rotatable element, the means for moving the wedges in unison towards and away from the shaft being a pair of flanges freely carried upon the shaft in spaced apart relation and between which the wedges are slidably mounted, the flanges containing a plurality of orifices, each orifice being in alignment with the end of a wedge, a set of push pins slidably contained within the orifices in each flange and engaging the adjacent faces of the wedges and whereby pushing movement of one set of pins slides the wedges in one direction and pushing movement of the other set of pins slides the wedges in the opposite direction, and means for pushing either set of pins in unison, the set of push pins slidably contained within one flange extending through the orifices in the flange portion of the cage, the orifices in the flange portion of the cage being larger than the push pins extending therethrough, the cage having a play of rotatable movement relatively to the shaft and wedges, and resilient means tending to retain the push pins centrally of the orifices in the flange portion of the cage.

4. A mechanical clutch for transmission of power between a rotatable shaft having a smooth cylindrical face and a rotatable element having a bore through which the shaft extends and comprising a plurality of wedges arranged in spaced apart relation and mounted for sliding movement within the bore and having their inclined faces extending lengthwise of the shaft, the wedges slidably bearing against the rotatable element and positioned in radial arrangement around the shaft, movement of the wedges in one direction bringing them closer to the shaft to engage the clutch and in the opposite direction away from the shaft to disengage the clutch, a plurality of cylindrical rollers having their axes parallel to the axis of the shaft and interposed between the shaft and the wedges and arranged to loosely roll upon the shaft when the clutch is disengaged and to be engaged by the wedges and jammed between the wedges and the shaft when the wedges are moved to engage the clutch, and means for moving the wedges in unison towards and away from the shaft, and wherein the faces of the wedges engageable with the rollers are substantially parallel to the rollers and the axis of the shaft and the faces of the wedges remote from the rollers inclined in relation to the axis of the shaft, the wedges being slidably contained in a plurality of slots in the rotatable element and which are arranged in parallel and radial relation to the shaft, the inner faces of the slots having substantially the same inclination as the inclination of the adjacent faces of the wedges, a cage comprising a sleeve portion and a flange portion formed upon the end of the sleeve portion and surrounding the shaft to rotate in unison with the rotatable element and in which the sleeve portion is formed with a plurality of orifices within which the rollers are freely contained and the flange portion formed with a plurality of orifices in alignment with the ends of the wedges in the rotatable element, the means for moving the wedges in unison towards and away from the shaft being a pair of flanges freely carried upon the shaft in spaced apart relation and between which the wedges are slidably mounted, the flanges containing a plurality of orifices, each orifice being in alignment with the end of a wedge, a set of push pins slidably contained within the orifices in each flange and engaging the adjacent faces of the wedges and whereby pushing movement of one set of pins slides the wedges in one direction and pushing movement of the other set of pins slides the wedges in the opposite direction, means for pushing either set of pins in unison, the set of push pins slidably contained within one flange extending through the orifices in the flange portion of the cage, the orifices in the flange portion of the cage being larger than the push pins extending therethrough, the cage having a play of rotatable movement relatively to the shaft and wedges, resilient means tending to retain the push pins centrally of the orifices in the flange portion of the cage, the faces of the wedges engageable with the rollers being of concave two face V-shape transversely of the length of the rollers and against either face of which the rollers may jam.

5. A mechanical clutch as defined in claim 4, wherein the resilient means is a pair of opposed springs of equal strength extending from one of the flanges carried upon the shaft to opposite sides of the flange portion of the cage.

References Cited in the file of this patent

UNITED STATES PATENTS

| | | |
|---|---|---|
| 1,045,315 | Mott | Nov. 26, 1912 |
| 2,293,085 | Stieber | Aug. 18, 1942 |
| 2,293,095 | Anderson | Aug. 18, 1942 |
| 2,754,947 | Marsden | July 17, 1956 |

FOREIGN PATENTS

| | | |
|---|---|---|
| 459,860 | France | Sept. 18, 1913 |
| 271,033 | Germany | Mar. 3, 1914 |
| 137,666 | Australia | June 23, 1950 |